Sept. 12, 1939.　　　　R. E. COLE　　　　2,172,362
FRONT WHEEL DRIVE MECHANISM FOR VEHICLES
Filed July 26, 1937　　　2 Sheets-Sheet 1
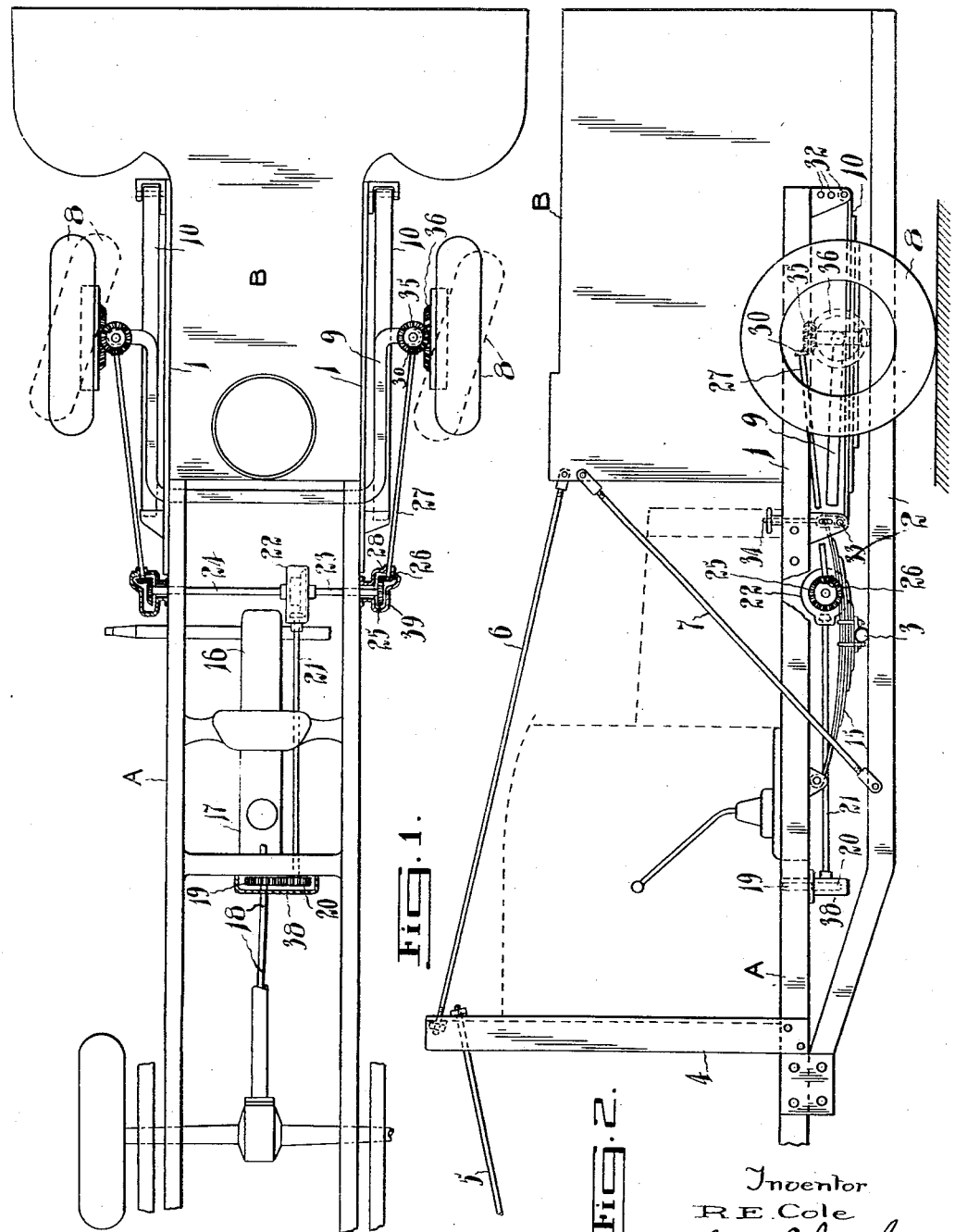
Inventor
R. E. Cole
by George P. Mackie
ATTY Patented Sept. 12, 1939

2,172,362

UNITED STATES PATENT OFFICE 2,172,362

FRONT WHEEL DRIVE MECHANISM FOR VEHICLES

Robert E. Cole, Highland Creek, Ontario, Canada

Application July 26, 1937, Serial No. 155,701

5 Claims. (Cl. 180—44)

This invention relates to the driving of motor trucks and automobiles, and one object of my invention is to provide a simple and easily installed apparatus for providing a power drive for the front wheels of the vehicle in addition to the usual drive for the rear wheels.

Motor trucks are now used for pushing snow plows, and other appliances. Usually these appliances are carried by the forward end of the truck, which makes an abnormal load on the latter, and makes it difficult to drive and steer. A further object of my invention, therefore, is to provide ground wheels for the appliance and attach the appliance to the truck chassis in such a way that the regular front wheels of the truck may be removed and the load carried entirely by the ground wheels of the appliance, and to provide means for providing a power drive from the truck motor for the said appliance ground wheels.

I attain my object by means of the constructions hereinafter described and illustrated in the accompanying drawings in which—

Fig. 1 is a plan view of the forward end of a truck chassis with a snow plow mounted in front thereof; and Fig. 2 is a side elevation of the same, partly broken away.

In the drawings like numerals of reference indicate corresponding parts in the different figures.

Figure 4:
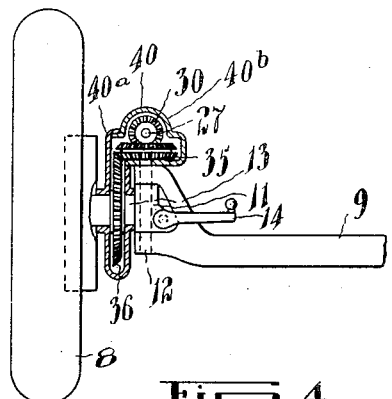
Fig. 4 is a detail illustrating the front wheel driving means.
Figure 5:
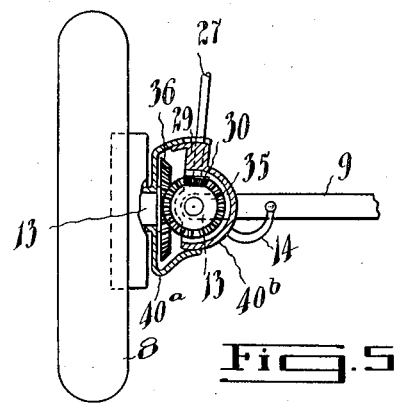
Fig. 5 is a plan view of the same, partly in section.

Referring to Figs. 1 and 2, A indicates the front end of an ordinary truck chassis, while B indicates the casing or frame of a snow plow device or other appliance used at the front of the truck. The appliance casing or frame is rigidly but detachably connected with the forward end of the truck chassis so as to form an extension of the latter. The connection may be made in various ways, although I show the frame B as provided with side bars 1 which are bolted or clamped to the sides of the chassis. The frame B is also provided with bottom bars 2, which extend below the front axle 3 of the truck and are inclined upwardly and secured to the chassis just behind the cab. Posts 4 extend upwardly from the chassis adjacent the cab and the upper ends of these posts are connected by truss rods 5 to the rear part of the truck chassis (not shown), and by truss rods 6 to the upper part of the frame B. To give additional strength truss rods 7 connect the upper part of the frame B with the bottom bars 2. It will thus be seen that the appliance frame B, while readily detachable, forms a very rigid extension of the truck chassis A.

The appliance frame B is supported by ground wheels 8 mounted on the ends of an axle 9. As in the present case, the appliance frame extends below the wheel axis, the axle is bent into U-shape with the bottom of the U extending around the rear of the frame B as will be clearly seen in Figs. 1 and 2. It will be understood, of course, that the axle may in some cases be shaped if desired to extend below the appliance frame, or that independent short axles may be employed.

Leaf springs 10 are secured at their ends to depending brackets secured to the side members 1 and have the axle connected thereto intermediate their ends.

In order that the appliance may be steered, the axle 9 is provided with a steering knuckle 11 at each end swingable on a pivot pin 12 and the ground wheels are journalled on the knuckle spindles 13. The steering knuckles have steering arms 14 connected therewith for steering purposes in a usual manner.

As stated above, it will be seen that the appliance frame and the truck chassis are very rigidly connected together, and as the appliance frame is provided with its own ground wheels, the front wheels of the truck may therefore be removed, and the front axle 3 of the truck will therefore be supported by the bottom bars 2 as shown in Fig. 2, while the springs 15 will tend to resist any movement of the truck axle 3, although clips may be used to hold the axle 3 in place.

In order that the height of the appliance frame B may be regulated, the forward end of the leaf spring 10 may be connected at different positions, a series of holes 32 being provided for this purpose. The rear end of said leaf spring 10 has its shackle connected to a pin 33 which is carried on the lower end of an adjusting screw 34.

It is desired, as stated in the preamble of the specification to provide means for driving the appliance wheels 8, and I have devised the following mechanism for this purpose.

16 indicates the truck motor, and 17 the transmission or change speed gearing, from which projects the drive shaft 18. On this drive shaft outside the transmission housing is mounted a pinion 19, which meshes with a pinion 20 on a second drive shaft 21 which drives a second differential 22, which in turn drives the transverse shafts 23 and 24. From the shaft 23 is driven the right wheel 8, while from the shaft 24 is driven the left wheel 8, and as the drive in each case is similar, it will only be necessary to describe the drive at one side.

Figure 6:
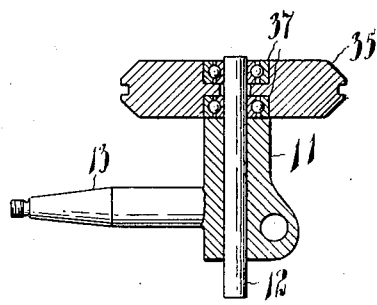
Fig. 6 is a detail showing the method of mounting the front wheel driving gear.

On the end of the shaft 23 is a pinion 25, which meshes with a pinion 26 on one end of a shaft 27 supported in bearings 28 and 29. This shaft 27 may have one or more universal joints therein to provide for the necessary relative movement between the ground wheels and frame A. The other end of the shaft 27 has a bevel pinion 30 thereon which meshes with one side of a double pinion 35 rotatable on the steering knuckle pin 12. The other side of this double pinion meshes with a ring gear 36 secured to or connected with the wheel 8 so as to drive the latter. It will be apparent that as the gear 35 is co-axial with the steering knuckle pivot pin 12, the swinging of the steering knuckle under steering action will not in any way interfere with the driving of the wheels. To prevent friction or wear on the gear 35 or pivot pin 12, anti-friction bearings 37 are provided as shown in Fig. 6.

It is desirable that all gears be protected as far as possible from grit or dirt, and also that they be properly lubricated, and therefore, as will be seen in Fig. 1 the gears 19 and 20 are enclosed in a housing 38, the gears 25 and 26 in a housing 39, of which the bearing 28 may form a part, and the gears 30, 35 and 36 in a housing 40, which, on account of the relative movement between the wheel 8 and axle 9 is formed of two sections 40ª and 40ᵇ, one of which encloses the ring gear 36 and swings with the wheel, while the other remains stationary with the axle. A suitable fitting will be provided for each housing for inserting the necessary lubricant.

Figure 3:
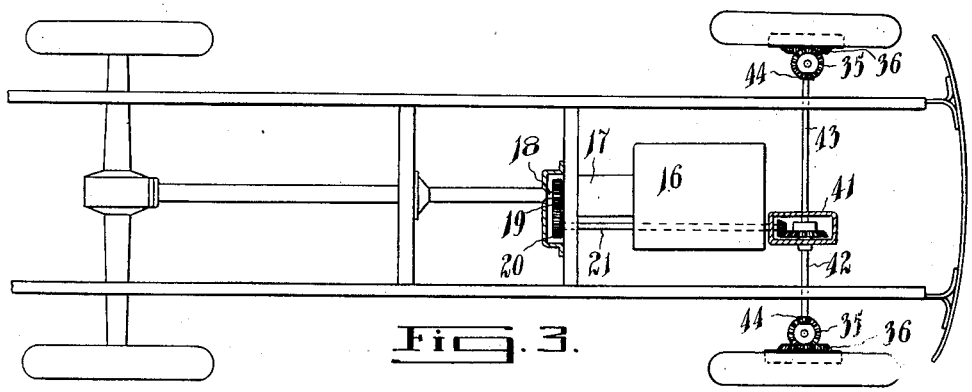
Fig. 3 is a plan view of the forward end of a chassis showing the front wheel drive mechanism applied thereto.

In Fig. 3 is shown a simple method of applying a front wheel drive to an ordinary truck or automobile.

16 is the motor, 17 the transmission casing, and 18 the drive shaft. Gears 19 and 20 are provided for driving the front drive shaft 21, which directly drives the forward differential gear assembly 41, which in turn drives the shafts 42 and 43. Each of the shafts 42 and 43 has a pinion 44 on its end which engages the upper ring of teeth on the gear 35.

It will be evident, of course, that two separate gears may be provided instead of the integral double gear with teeth on each face. The ring gear 36 and its enclosing housing will be secured to the wheel in such a way as not to interfere with the operation of the usual brake mechanism.

It will be seen from the construction described that I have devised simple means for supporting a snow plow or other appliance in front of a truck, and also that I have devised simple means for providing a drive for the wheels of said appliance, or the front wheels of the vehicle itself.

What I claim as my invention is:

1. The combination with a self-propelled vehicle including a chassis having rear ground wheels, a power plant on said chassis, and transmission means for driving said rear ground wheels from said plant, of an appliance having a frame rigidly connected to the forward end of said chassis; axle means on said appliance; front ground wheels on said axle means for supporting the appliance and the forward end of the chassis; drive shaft means extending transversely of the forward part of the chassis to the rear of the appliance; independent gearing for driving each of the front ground wheels; a shaft extending rearwardly from each wheel gearing at each side of the appliance and driven from said transverse shaft means; and means for driving said transverse drive shaft means from the power plant on the chassis.

2. The combination with a self-propelled vehicle including a chassis having a rear axle, rear ground wheels on said rear axle, a power plant on said chassis, and transmission means for driving said rear ground wheels from said plant, of an appliance having a frame rigidly but detachably connected to the forward end of said chassis; axle means on said appliance; front ground wheels on said axle means for supporting the appliance and the forward end of the chassis; drive shaft means extending transversely of the forward part of the chassis to the rear of the appliance; independent gearing for driving each of the front ground wheels; a shaft extending rearwardly from each wheel gearing at each side of the appliance and driven from said transverse shaft means; and means for driving said transverse drive shaft means from the power plant on the chassis.

3. The combination with a self-propelled vehicle including a chassis having rear ground wheels, a power plant on said chassis, of an appliance having a frame rigidly connected to the forward end of said chassis; axle means on said appliance; front ground wheels on said axle means for supporting the appliance and the forward end of the chassis; drive shaft means extending transversely of the forward part of the chassis to the rear of the appliance; independent gearing for driving each of the front ground wheels; a shaft extending rearwardly from each wheel gearing at each side of the appliance and driven from said transverse shaft means; and means for driving said transverse drive shaft means from the power plant on the chassis.

4. The combination with a self-propelled vehicle including a chassis having rear ground wheels, a power plant on said chassis, and transmission means for driving said rear ground wheels from said plant, of an appliance having a frame rigidly connected to the forward end of said chassis; axle means on said appliance; front ground wheels on said axle means for supporting the appliance and the forward end of the chassis; drive shaft means extending transversely of the forward part of the chassis to the rear of the appliance; means at each side of the appliance for driving each front ground wheel from said transverse shaft means; and means for driving said transverse shaft means from the power plant on the chassis.

5. The combination with a self-propelled vehicle including a chassis having rear ground wheels, a power plant on said chassis, and transmission means for driving said rear ground wheels from said plant, of an appliance having a frame rigidly connected to the forward end of said chassis; axle means on said appliance; front ground wheels on said axle means for supporting the appliance and the forward end of the chassis; independent gearing for driving each of the front ground wheels; means extending rearwardly along each side of the appliance for driving the front wheel gearing; and means for driving said last mentioned means from the power plant on the chassis.

ROBERT E. COLE.